US008643843B2

(12) United States Patent
Hulm et al.

(10) Patent No.: US 8,643,843 B2
(45) Date of Patent: Feb. 4, 2014

(54) METHOD OF ESTIMATING A DEGREE OF CONTAMINATION OF A FRONT SCREEN OF AN OPTICAL DETECTION APPARATUS AND OPTICAL DETECTION APPARATUS

(75) Inventors: Christian Hulm, Freiburg im Breisgau (DE); Manuel Möhrle, Waldkirch-Buchholz (DE)

(73) Assignee: Sick AG, Waldkirch/Breisgau (DE)

( * ) Notice: Subject to any disclaimer, the term of this patent is extended or adjusted under 35 U.S.C. 154(b) by 135 days.

(21) Appl. No.: 13/352,777

(22) Filed: Jan. 18, 2012

(65) Prior Publication Data

US 2012/0182553 A1 Jul. 19, 2012

(30) Foreign Application Priority Data

Jan. 19, 2011 (EP) .................................... 11000401

(51) Int. Cl.
*G01N 21/00* (2006.01)
(52) U.S. Cl.
USPC ...................... 356/432; 356/237.1; 356/239.2
(58) Field of Classification Search
USPC ........................ 356/237.1, 239.2–239.2, 432
See application file for complete search history.

(56) References Cited

U.S. PATENT DOCUMENTS

| 8,248,595 B2 * | 8/2012 | Ochiai et al. ................ 356/237.2 |
| 2002/0018198 A1 | 2/2002 | Pierenkemper |
| 2010/0128248 A1 | 5/2010 | Heizmann et al. |

FOREIGN PATENT DOCUMENTS

| EP | 2 182 378 A1 | 5/2010 |
| WO | 2008/154736 A1 | 12/2008 |

OTHER PUBLICATIONS

European Search Report, Application No. EP 11 00 0401, dated Mar. 1, 2011, with English Translation, seven (7) pages.

* cited by examiner

*Primary Examiner* — Tara S Pajoohi Gomez
(74) *Attorney, Agent, or Firm* — Nath, Goldberg & Meyer; Jerald L. Meyer

(57) ABSTRACT

A method for estimating a degree of contamination of a front screen of an optical detection apparatus is provided comprising the steps: Transmitting a plurality (p) of transmission radiation pulses into a detection zone; generating a reception signal for each transmission radiation pulse including a plurality (q) of sampled values, a sampled value indicating the intensity of the received back radiation of the transmission pulse after a predefined time interval from the transmission of the transmission radiation pulse; generating an averaged reception signal having a plurality (q) of sampled values from the plurality of reception signals, with those respective sampled values of the reception signals being added which were determined at mutually corresponding points in time to determine a sampled value of the averaged reception signal; generating at least one front screen contamination value by evaluating an amplitude value and/or a measured peak shape value of the averaged signal.

13 Claims, 1 Drawing Sheet

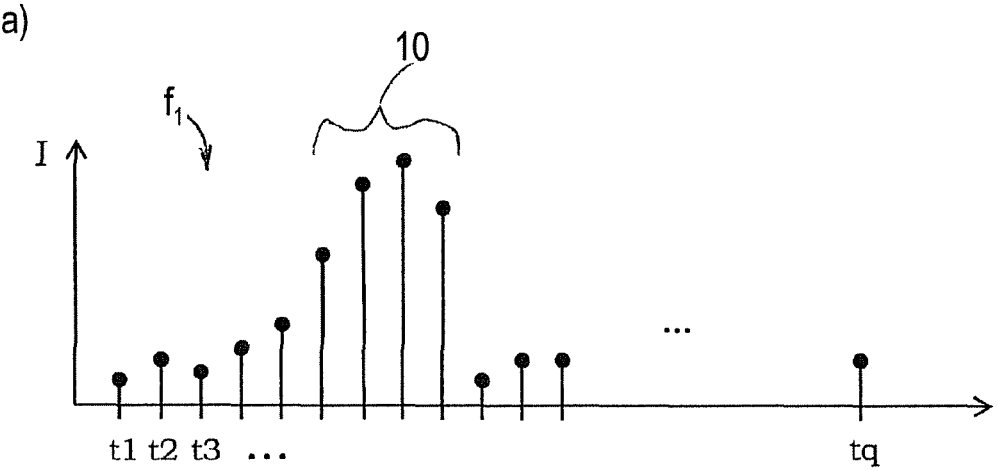
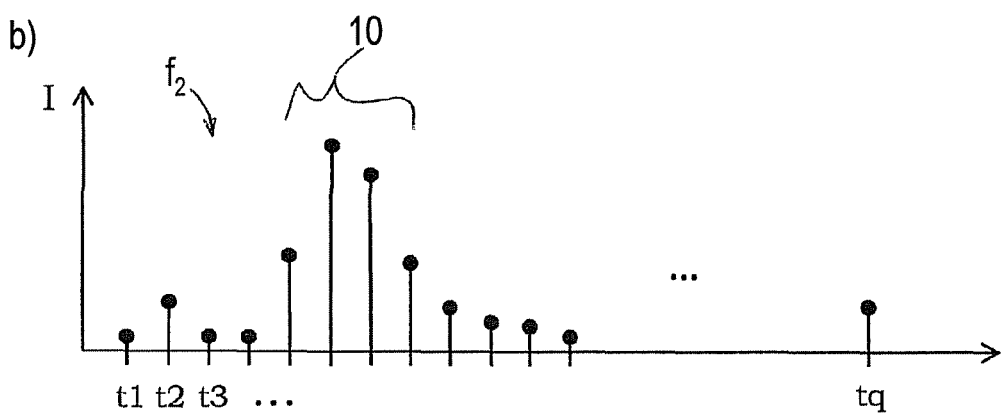
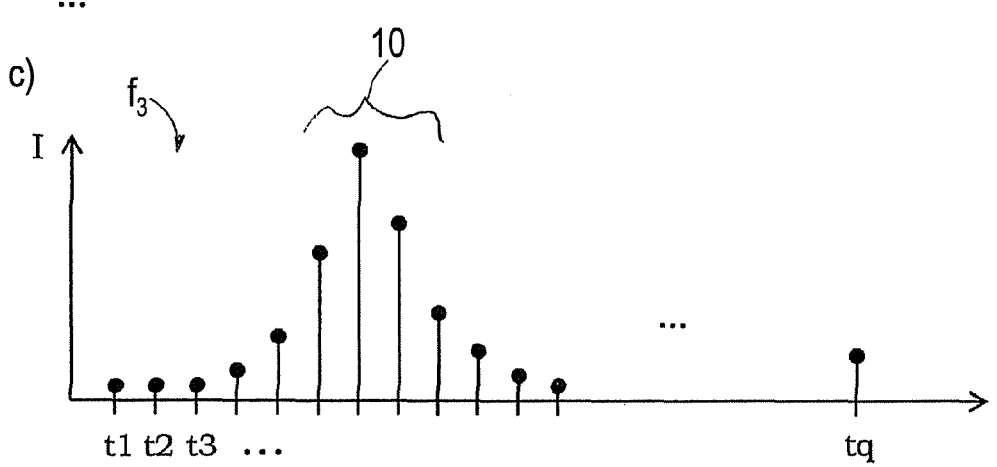

METHOD OF ESTIMATING A DEGREE OF CONTAMINATION OF A FRONT SCREEN OF AN OPTICAL DETECTION APPARATUS AND OPTICAL DETECTION APPARATUS

BACKGROUND

1. Technical Field

The present invention relates to a method of estimating a degree of contamination of a front screen of an optical detection apparatus which includes the transmission of a plurality of transmission radiation pulses into a detection zone as well as the generation of a reception signal for each transmission radiation pulse, wherein the reception signal has a plurality of sampled values and a sampled value respectively indicates the intensity of the received back radiation of the respective transmission radiation pulse at a point in time at a predefined time interval from the transmission of the transmission radiation pulse. The invention additionally relates to a corresponding optical detection apparatus.

2. Related Art

An optical detection apparatus, e.g. a laser scanner, usually has a front screen which is arranged in the beam path between a transmission unit of the optical detection unit and the environment to be detected.

EP 2 182 378 A1 discloses a laser scanner which performs a method for estimating a degree of contamination of a front screen. To evaluate the transmissibility of the front screen of the optical detection apparatus, the laser scanner is designed to compare a selected peak of a received reception signal with an expected signal shape.

Due to noise effects and further interference effects present in the reception signal, an existing contamination of the front screen can in this respect only be detected with a limited reliability and the degree of contamination of the front screen can only be determined with limited accuracy.

In another method for estimating a degree of cleanliness of a front screen, additional LEDs are used which transmit light which irradiates the front screen and is detected by a photodiode. A contamination of the front screen can in this respect be detected by monitoring the photodiode current. The front screen is in this respect positioned obliquely with respect to a direction of transmission of the scanner so that the light of the LED irradiates the front screen and can be detected by the photodiode arranged beneath the LED in a housing of the scanner. This results in a front screen in the form of a frustoconical jacket, with this form producing an additional space requirement.

SUMMARY OF INVENTION

It is the object of the invention to provide a method which allows a reliable and accurate estimate of a degree of contamination of a front screen of an optical detection apparatus and can be performed with a reduced effort as well as to provide an optical detection apparatus with which an estimate of a degree of contamination of the front disk is possible with high reliability and accuracy and with reduced construction effort.

A method having the features of the claimed subject matter is provided to satisfy this object.

The method in accordance with the invention comprises the generation of an averaged reception signal using a plurality of sampled values from the plurality of reception signals generated from the transmission radiation pulses, wherein in each case those sampled values of the reception signals are added to determine a sampled value of the averaged reception signal which were determined at mutually corresponding points in time, and comprises the generation of at least one front screen contamination value by evaluating an amplitude value and/or a measured peak shape value of the averaged reception signal.

It was recognized within the framework of the invention that a reliable and accurate statement on a contamination of the front screen can be derived from an amplitude value and/or measured peak shape value of an averaged reception signal whose sampled values are generated by adding the sampled values mutually corresponding in time of the individual reception signals respectively generated from a transmission radiation pulse. The underlying idea of the invention is to combine a plurality of reception signals belonging to different transmission radiation pulses to an averaged reception signal and in so doing initially deliberately to neglect the spatial and/or temporal resolution of the optical detection apparatus theoretically made possible by the plurality of transmitted transmission radiation pulses with respect to the contamination estimate.

This is based on the consideration that a contamination of the front screen only changes insignificantly as a rule over the temporal and/or spatial interval lying between two adjacent transmission radiation pulses. Such a contamination therefore results in a change of a front screen peak representing the front screen characteristic for the contamination in the averaged reception signal, whereas interference effects such as noise are suppressed so that a wanted signal results which is meaningful and easy to evaluate.

An estimate of a contamination of the front screen is therefore possible with high accuracy and reliability by evaluating an amplitude value and/or a measured peak shape value of the averaged reception signal.

Since the degree of contamination is estimated by the evaluation of transmission radiation pulses which are reflected back by the front screen, it is not necessary to provide additional LEDS or an additional photo-receiver which is disposed behind the front screen viewed in the direction of radiation so that the provision and assembly of these components can be dispensed with and the additional energy consumption associated with their operation can be avoided. In addition, an oblique positioning of the front screen can be dispensed with and thus a smaller construction space for the optical detection apparatus can be ensured.

On recognizing a contamination or an exceeding of a predefined degree of contamination with reference to the front screen contamination value produced, a warning perceivable for a user can e.g. be output.

In the present text, the terms "light" and "radiation" are used not only for visible light, but also for radiation of a different wavelength, e.g. ultraviolet or infrared.

Advantageous embodiments of the invention are described in the dependent claims, in the description and in the Figures.

In accordance with an advantageous aspect of the method, a deviation of the at least one front screen contamination value from a previously taught desired value is determined to estimate a degree of contamination of the front screen. Such a desired value can be taught for the amplitude value, for the measured peak shape value or for both.

A front screen peak in the averaged reception signal can initially be identified to produce the front screen contamination value. For this purpose, a peak of the averaged reception signal can be looked for within a front screen time interval which corresponds to the time interval in which, starting from a transmission point in time of a transmission radiation pulse, a reception of radiation of the transmission radiation pulse radiated back from the front screen is expected.

A shape analysis can be carried out, for example, at a peak thus determined or an amplitude of the peak can be determined.

The evaluation of the averaged reception signal can also include the use of a correlation and/or regression to the sampled values of the averaged reception signal.

The method is e.g. suitable for use with an optical detection apparatus working in according with the principle of the time of flight of light. In this respect, on recognizing an object, the distance of the object is determined with reference to the time elapsed between the transmission of the transmission radiation pulse and the reception of radiation reflected back from the object. The determined time of flight of light is divided by the speed of light and by two (to take account of the forward and return path of the light) to obtain the object distance. The time of flight of light can be acquired via a measurement of the time interval between the transmission of the transmission radiation pulse and a characteristic property of a peak representing the object, for example its tip.

A reception signal averaged over a plurality of transmission radiation pulses as described herein cannot only be used to estimate a contamination of the front screen, but also for detecting objects located behind the front screen in the monitored zone of the optical detection apparatus, i.e. the averaged reception signal produced by the pulse averaging is used for object detection and for this purpose also includes those sampled values which represent the averaged back radiation from the monitored zone located behind the front screen.

In principle, a plurality of very short transmission radiation pulses can also be transmitted using the method in accordance with the invention which in particular follow one another at a very short time interval or an optical detection apparatus can be used which transmits such a plurality of transmission radiation bundles. In this respect, transmission radiation pulses having a relatively small radiation power and/or a receiver having a relatively small sensitivity can deliberately be used, which can result in a reception signal of a transmission radiation pulse which has a relatively small signal-to-noise ratio. The signal-to-noise ratio to be expected can even be so low that no reliable evaluation is possible with reference to an individual transmission radiation pulse since the associated reception signal is substantially lost in the noise. The noise influence can, however, be statistically eliminated so much by the generation of a reception signal averaged as described herein from a plurality of transmission radiation pulses that an easily evaluable wanted signal is acquired in the form of the averaged reception signal. It is in particular advantageous in this aspect that due to the smaller required radiation power of a transmission radiation pulse and/or sensitivity of the receiver, much smaller and much less expensive components can be used which allow an even greater miniaturizing of the optical detection apparatus with a simultaneously reliable front screen monitoring.

The method can in particular also be used with an optical scanner, in particular with a laser scanner, in which the transmission radiation pulses are directed into different directions following one another in a scan direction in the detection zone during a scan sweeping over a scan angle.

The averaged reception signal is then produced from the reception signals which belong to the transmission radiation pulses transmitted following one another in time.

In accordance with an advantageous aspect of the method, at least 40 mutually following transmission radiation pulses are transmitted into the detection zone per 1° scan angle during a scan. In principle, the number of transmission radiation pulses per 1° scan angle can also amount to 100 or more. Despite the averaging provided, a high spatial resolution for the contamination estimate can be achieved in the direction of scan by such a number of transmission radiation pulses. An averaged reception signal can be produced, for example, from at least 40, at least 100, or more, reception signals, in which case a spatial resolution of the contamination estimate results in the scan direction in an order of magnitude of one degree scan angle.

In principle, the sampled values of the generated reception signals can be added over a part range of the scan angle of the optical detection apparatus. A spatially resolved contamination estimate can be realized by addition of the produced reception signals only over a part range of the scan angle. This means that a contamination which does not extend over the whole scan angle on the front screen or is at least not homogeneously over the total scan angle can be recognized in a spatially resolved manner.

Equally, the sampled values of the generated reception signals can be added over the total scan angle range of the optical detection apparatus. When the sampled values of the reception signals generated over the total scan angle range enter into the averaged reception signal, a particularly accurate estimate of the degree of contamination of the front screen is possible considered over the total scan angle.

The sampled values contained in the averaged reception signal can in principle be calculated as floating mean values from the sampled values of a predefined number of the last generated reception signals.

In accordance with an advantageous aspect of the method, each reception signal includes at least 10, preferably 50, sampled values which lie in a front screen time interval following the transmission point in time of the respective transmission radiation pulse, with the front screen time interval corresponding to that time interval in which a reception of radiation of the transmission radiation pulse radiated back from the front screen is expected.

In principle, the time in which such radiation is expected results as a time interval and not as a single point in time since the transmitted transmission radiation pulses are in particular not as short as desired, but rather have a temporal extent, which has the result that the front section of a transmission radiation pulse transmitted the earliest in time is incident onto the receiver at an earlier time than the back section transmitted the latest. In addition, an imprecision of the knowledge of the exact transmission point in time of a transmission radiation pulse can flow into the front screen time interval.

A sufficient temporal resolution can be ensured by the generation of at least 50 sampled values of a reception signal in the front screen time interval to be able to evaluate a front screen peak with high accuracy.

A further advantageous aspect of the method provides that the time interval of two mutually following sampled values of a reception signal amounts to less than or equal to 1 nanosecond, in particular less than or equal to 625 picoseconds. In this manner, also when very short pulses are used as transmission radiation pulses whose time extent is, for example, in the range from 1 to 10 nanoseconds, a sufficient temporal resolution can be ensured to allow a meaningful analysis of a front screen peak or of its amplitude and/or shape for the estimate of the front screen contamination.

In addition to the estimate of a degree of contamination of the front screen, the averaged reception signal can also be used for a functional check of the optical detection apparatus. It can thus be determined by checking the averaged reception signal for the presence of a front screen peak whether the optical detection apparatus is operational or not in principle. A distance measurement for the front screen resulting from the averaged reception signal or from a front screen peak can in particular be compared with an expected value for this purpose. If no front screen peak is recognized or if a deviating front screen distance is determined, a warning perceivable for a user can e.g. be generated to indicate that the apparatus is defective. A separate reference target measurement and the provision of a separate reference object of the optical detection apparatus can then be dispensed with since the front screen itself acts as a reference object.

The optical detection apparatus in accordance with the invention is in particular designed for carrying out a method in accordance with the invention as described above. The advantageous embodiments and advantages described above with respect to the method in accordance with the invention can be realized in an analog manner in the optical detection apparatus in accordance with the invention.

In accordance with an advantageous embodiment, the optical detection apparatus is designed as an optical scanner, in particular as a laser scanner. The optical detection apparatus can include a deflection device such as a mirror to direct the transmission radiation pulses into the detection zone in different directions following one another in a scan direction during a scan sweeping over a scan angle.

The optical detection apparatus can include a field programmable gate array (FPGA) which is designed for generating the sampled values of the reception signals and of the averaged reception signal. Everything from the generation of the sampled values of the reception signals to the generation of the front screen contamination value preferably takes place in the same FPGA. Within the framework of the invention, one and the same FPGA can be used both for estimating the front screen contamination and for detecting objects present in the detection zone of the optical detection apparatus.

The invention will be described in the following by way of example with reference to an advantageous embodiment and to the enclosed schematic Figure. There are shown:

BRIEF DESCRIPTION OF THE DRAWINGS

FIG. 1a a first exemplary reception signal generated from a transmission radiation pulse and having a plurality of q sampled values;

FIG. 1a a second exemplary reception signal generated from a transmission radiation pulse and having a plurality of q sampled values; and FIG. 1c an exemplary averaged (and normed) reception signal having a plurality of q sampled values.

DETAILED DESCRIPTION

FIG. 1a shows a first reception signal (f1) which has been generated from a transmission radiation pulse and which includes a plurality of q sampled values f1(t1) to f1(tq), wherein a sampled value f1(tj), j=1 ... q respectively indicates the intensity I of the received back radiation of the transmission radiation pulse at a point in time tj at a predefined time interval from the transmission of the transmission radiation pulse (t=0). Only some sampled values f1(tj) are shown as representatives in FIG. 1a. In reality, the number q of sampled values fi(tj), j=1 ... q per reception signal fi, i=1 ... p can be substantially larger. FIG. 1b shows a second reception signal f2 which was generated from a second transmission radiation pulse transmitted following the first transmission radiation pulse.

The reception signals f1 and f2 shown in FIGS. 1a and 1b are representative for a plurality of reception signals fi, i=1 ... p which belong to transmission radiation pulses transmitted following one another and whose sampled values fi(tj), i=1 ... p, j=1 ... q are recorded and used for generating an averaged reception signal fΣ. The sampled values fi(tj) are generated by an analog/digital converter in the present example and are stored as digital values.

The averaged reception signals fΣ likewise includes q sampled values FΣ(t1) to fΣ(tq), wherein each sampled value fΣ(t1) j=1 ... q is generated by adding those sampled values f1(tj) to fp(tj) which were determined at mutually corresponding points in time tj, that is $$f\Sigma(t1) = f1(t1) + f2(t1) + \ldots + fp(t1),$$
$$f\Sigma(t2) = f1(t2) + f2(t2) + \ldots + fp(t2),$$
$$\ldots$$
$$f\Sigma(tq) = f1(tq) + f2(tq) + \ldots + fp(tq).$$

Each reception signal fi, i=1 ... p has a more or less clear front screen peak 10 at a front screen time interval of the reception signals fi, i=1 ... p. As visible in FIG. 1c, the averaged reception signal fΣ has a very characteristic front screen peak 10. At least one front screen contamination value is generated by evaluating an amplitude value and/or a measured peak shape value of the averaged reception signal fΣ and is compared with a previously taught desired value to estimate a contamination degree of the front screen with high reliability and accuracy.

| Reference numeral list | |
|---|---|
| 10 | front screen peak |
| f1, f2 | reception signal |
| fΣ | averaged reception signal |
| I | intensity |
| t | time |
| t1 ... tq | point in time |

The invention claimed is:

1. A method of estimating a degree of contamination of a front screen of a laser scanner, which comprises the steps of:

transmitting a plurality (p) of transmission radiation pulses into a detection zone;

generating a reception signal (f1, f2) for each transmission radiation pulse which includes a plurality (q) of sampled values, wherein a sampled value respectively indicates the intensity (I) of the received back radiation of the respective transmission radiation pulse at a point in time (t1 ... tq) at a predefined time interval from the transmission of the transmission radiation pulse, generating an averaged reception signal (fΣ) having a plurality (q) of sampled values from the plurality of reception signals (f1, f2) generated from the transmission radiation pulses, with those respective sampled values of the reception signals (f1, f2) being added which were determined at mutually corresponding points in time (t1 ... tq) to determine a sampled value of the averaged reception signal (fΣ); and generating at least one front screen contamination value by evaluating at least one of an amplitude value and a measured peak shape value of the averaged reception signal (fΣ).

2. A method in accordance with claim 1,
wherein a deviation of the at least one front screen contamination value from a previously taught desired value is determined to estimate a degree of contamination of the front screen.

3. A method in accordance with claim 1,
wherein a peak (10) of the averaged reception signal (fΣ) is identified and evaluated for determining the at least one front screen contamination value.

4. A method in accordance with claim 1,
wherein the transmission radiation pulses are directed into the detection zone in different directions following one another in the scan direction during a scan sweeping over a scan angle.

5. A method in accordance with claim 4,
wherein at least 40 mutually following transmission radiation pulses are transmitted into the detection zone per 1° scan angle during a scan.

6. A method in accordance with claim 4,
wherein the sampled values of the generated reception signals (f1, f2) are added over a part range of the scan angle of the laser scanner.

7. A method in accordance with claim 4,
wherein the sampled values of the generated reception signals (f1, f2) are added over the total range of the scan angle of the laser scanner.

8. A method in accordance with claim 1,
wherein each reception signal (f1, f2) includes at least 10 sampled values which lie in a front screen time interval following the transmission point in time of the respective transmission radiation pulse, with the front screen time interval corresponding to a time interval in which a reception of radiation of the transmission radiation pulse radiated back from the front screen is expected.

9. A method in accordance with claim 8,
wherein each reception signal (f1, f2) includes 50 sampled values which lie in a front screen time interval following the transmission point in time of the respective transmission radiation pulse, with the front screen time interval corresponding to a time interval in which a reception of radiation of the transmission radiation pulse radiated back from the front screen is expected.

10. A method in accordance with claim 1,
wherein the time interval of two mutually following sampled values of a reception signal (f1, f2) amounts to less than or equal to 1 ns.

11. A method in accordance with claim 10,
wherein the time interval of two mutually following sampled values of a reception signal (f1, f2) amounts to less than or equal to 625 ps.

12. A method in accordance with claim 1,
wherein a determination is made by checking the averaged reception signal for the presence or the position of a front screen peak whether the laser scanner is operational or not.

13. A method in accordance with claim 12,
wherein a warning is output when it is found that the laser scanner is not operational.

* * * * *